(12) United States Patent
Stengard et al.

(10) Patent No.: US 7,328,192 B1
(45) Date of Patent: Feb. 5, 2008

(54) ASYNCHRONOUS DATA MINING SYSTEM FOR DATABASE MANAGEMENT SYSTEM

(75) Inventors: Peter Stengard, Delray Beach, FL (US); Sunil Venkayala, Lowell, MA (US)

(73) Assignee: Oracle International Corporation, Redwood Shores, CA (US)

( * ) Notice: Subject to any disclaimer, the term of this patent is extended or adjusted under 35 U.S.C. 154(b) by 363 days.

(21) Appl. No.: 10/230,267

(22) Filed: Aug. 29, 2002

Related U.S. Application Data

(60) Provisional application No. 60/378,980, filed on May 10, 2002.

(51) Int. Cl.
*G06F 15/18* (2006.01)
(52) U.S. Cl. .................... 706/12; 707/1; 707/6
(58) Field of Classification Search ........... 707/1–206; 706/12
See application file for complete search history.

(56) References Cited

U.S. PATENT DOCUMENTS

| 5,692,107 | A | * | 11/1997 | Simoudis et al. | 706/12 |
| 5,884,305 | A | * | 3/1999 | Kleinberg et al. | 707/6 |
| 6,058,389 | A | * | 5/2000 | Chandra et al. | 707/1 |
| 6,112,194 | A | * | 8/2000 | Bigus | 706/11 |
| 6,836,773 | B2 | * | 12/2004 | Tamayo et al. | 707/6 |
| 6,865,573 | B1 | * | 3/2005 | Hornick et al. | 707/6 |

OTHER PUBLICATIONS

"Performance analysis of Distributed client-server message queuing", E. Zimran, M. Rosen, Parallel & Distributed Syst., 1994, International Conf. on Dec. 19-21, 1994, pp. 550-555.*
"Data mining: machine learning, statistics, and databases", H. Mannila, Scientific and Statistical Database Systems, 1996. Proceedings, Eighth Intern Conference on Jun. 18-20, 1996, pp. 2-9.*
"A Multi-Tier Architecture for High-Performance Data Mining", R. Rantzau & H. Schwarz, Univeristy of Stuttgart, Institute of Parallel and Distributed High-Performance Systems, http://elib.uni-stuttgart.de/opus/volltexte/1999/524/pdf/btw1999.pdf.*
"Integration of Data Mining and Relational Databases", A. Netz, S. Chaudhuri, J. Bernhardt, U. Fayyad, Microsoft, USA, Proceedings of the 26th International Conference on Very Large Databases, Cairo, Egypt, 2000.*

* cited by examiner

*Primary Examiner*—David Vincent
*Assistant Examiner*—Mai T Tran
(74) *Attorney, Agent, or Firm*—Bingham McCutchen LLP

(57) ABSTRACT

A data mining system for a database management system and method and computer program product therefore, that provides improved functionality over synchronous data mining systems, and which provides features such as interruptible tasks and status output. A data mining system for a database management system comprises a plurality of data mining task objects operable to perform data mining functions, a data mining task queue table operable to maintain at least one queue to manage execution of the data mining tasks, and a data mining system task monitor operable to monitor execution of currently executing data mining tasks, examine the data mining task queue table, select at least one task for execution, dequeue data mining tasks from the data mining task queue table, and initiate execution of the dequeued tasks.

24 Claims, 5 Drawing Sheets

US 7,328,192 B1

ASYNCHRONOUS DATA MINING SYSTEM FOR DATABASE MANAGEMENT SYSTEM

CROSS REFERENCE TO RELATED PATENT APPLICATIONS

This application is based on, and claims the benefit of, provisional application 60/378,980 filed May 10, 2002.

FIELD OF THE INVENTION

The present invention relates to a system, method, and computer program product for an asynchronous data mining system for a database management system.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database management systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior.

One application for data mining is in the analysis of data collected by companies and other organizations. These entities are amassing huge databases for a multitude of purposes including accounting, billing, profiling of customer activities and relations, manufacturing operations, web-site activity, and marketing efforts. To enhance corporate competitiveness, interest has focused on the creation of data-warehouses and the extraction of information from these warehouses. Purposes for this information include targeting marketing promotions in a cost-effective manner, improving the relevance of a web page to a visiting customer, displaying web-advertisements appropriate to the profile of a visiting customer, detecting fraudulent behavior, enhancing customer service, and streamlining operations.

Data mining typically involves long running computational processes to perform mining operations such as building a mining model, applying the model to compute score and probability, testing and evaluation of the built model, cross-validation of a model, lift computation, etc. Conventional data mining systems provide synchronous execution of data mining tasks. In synchronous execution, a data mining task cannot be gracefully interrupted during execution, for example, to determine the status of the task. Results are only available upon completion or termination of the task, which for a data mining task can be quite a long time. This can cause problems to arise. For example, if a client process that initiated a data mining task should crash or terminate execution, synchronous execution means that a user cannot obtain the status of the data mining task to determine what the error was in a timely manner. A need arises for a data mining system that provides improved functionality over synchronous data mining systems, and which provides features such as interruptible tasks and status output.

SUMMARY OF THE INVENTION

The present invention is a data mining system for a database management system, and a method and computer program product therefore, which provides improved functionality over synchronous data mining systems, and which provides features such as interruptible tasks and status output. The present invention provides data mining applications that use an asynchronous application program interface (API), which provides the capability to develop applications that need not wait for long running data mining processes to complete. This is done by loosely coupling the client and server by a server managed queuing system. The present invention also provides the architectural advantage for extensions like mining process definitions to combine multiple data mining tasks as a single process. The present invention also provides the ability to extend the scalability of the data mining system.

In one embodiment of the present invention, a data mining system for a database management system comprises a plurality of data mining task objects operable to perform data mining functions, a data mining task queue table operable to maintain at least one queue to manage execution of the data mining tasks, and a data mining system task monitor operable to monitor execution of currently executing data mining tasks, examine the data mining task queue table, select at least one task for execution, dequeue data mining tasks from the data mining task queue table, and initiate execution of the dequeued tasks.

In one aspect of the present invention, a data mining task to be enqueued in the data mining task queue table may be received from a client application. Control may be returned to the client application when enqueuing of the data mining task is complete.

In one aspect of the present invention, the data mining system task monitor may be further operable to determine a number of concurrent tasks executing in the data mining system, initiate execution of at least one data mining tasks, if the number of concurrent tasks running in the data mining system is less than a maximum number of concurrent data mining tasks that the data mining system can handle, and continue to monitor the data mining tasks that are being executed, if the number of concurrent tasks running in the data mining system is greater than or equal to the maximum number of concurrent data mining tasks that the data mining system can handle.

In one aspect of the present invention, the plurality of data mining task objects may comprise at least one of: a data mining build task object operable to build a data mining model, a data mining apply task object operable to apply a built data mining model to data to score the data and compute and associated probabilities, a data mining test task object operable to test a built mining model with a dataset to find an accuracy of the data mining model and compute a confusion matrix, a data mining lift task object operable to compute a lift of a data mining model, based on a positive target value and a number of quantiles, a data mining cross-validation task object operable to perform a cross-validation on a data mining model to determine an accuracy of the data mining model, a data mining import task object operable to import a data mining model in an external format to an internal format of the data mining system, and a data mining export task object operable to export a data mining model in an internal format of the data mining system to an external format.

In one aspect of the present invention, each of the data mining task objects may have a state indicating a behavior of the data mining task. The state of a data mining task may comprise: a ready state indicating that the task is ready to execute, a queued state indicating that the task is in the data mining task queue table and waiting to be executed, an initiated state indicating that the task is actually submitted for execution, an executing state indicating that the task is in execution, a success state indicating that a task execution succeeded, an error state indicating that the task execution failed, a terminating state indicating that the task is in a process of terminating, and a terminated state indicating that the task is terminated.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
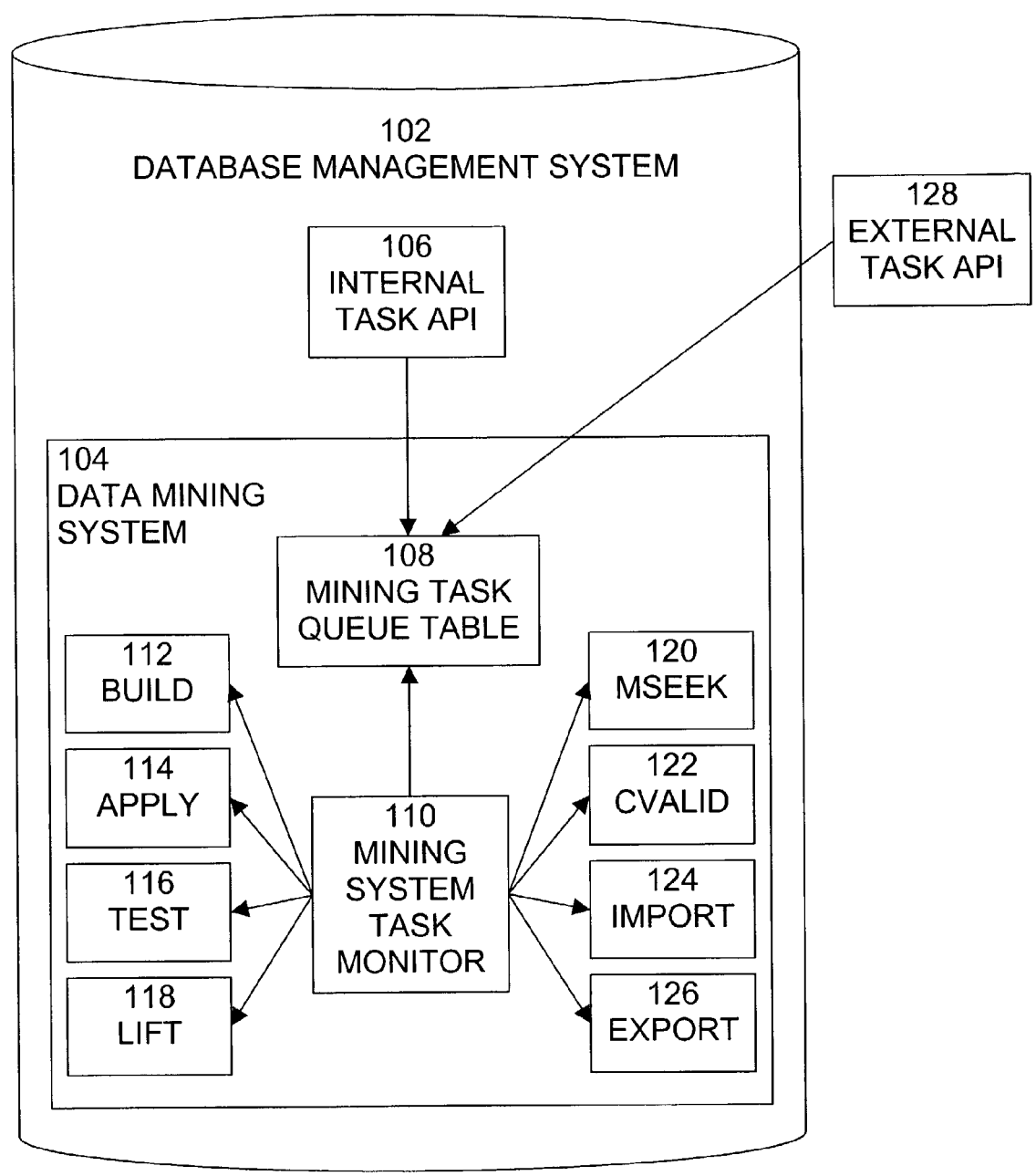
FIG. 1 is an exemplary block diagram of a database management system incorporating the mining task functionality of the present invention.

An example of a database management system 102 incorporating the mining task functionality of the present invention is shown in FIG. 1. Database management system (DBMS) 102 is typically implemented as a database server, which communicates with client systems and provides database services to those client applications running on those client systems. Database management system 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly you can extract information.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database, includes not only data, but also low-level database management functions, which perform accesses to the database and store or retrieve data from the database. Such functions are often termed queries and are performed by using a database query language, such as structured query language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:

computerized library systems
automated teller machines
flight reservation systems
computerized parts inventory systems Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

Database management system 102 includes data mining system (DMS) 104 and internal task application program interface (API) 106. Data mining system 104 includes mining task queue table 108, mining system task monitor 110, and a plurality of mining tasks, such as build task 112, apply task 114, test task 116, lift computation task 118, model seeker task 120, cross-validation task 122, model import task 124, and model export task 126. Internal task API 106 provides an interface to data mining system 104 for internal database application in database system 102. External task API 128 provides similar functionality for external applications, which are external to database management system 102 and which communicate with data mining system 104 through database management system 102.

Data mining system 104 performs data mining tasks in accordance with the present invention. Data mining system 104 includes mining task queue table 108, which maintains the queues that manage the performance of the data mining tasks. Internal task API 106 and external task API 128 provide an interface for applications to enqueue tasks into mining task data table 108, dequeue tasks from mining task data table 108, and manage tasks in mining task data table 108. Data mining system monitor 110 monitors the execution of the currently executing the tasks in data mining system 104, examines data mining task queue table 108, selects tasks for execution, dequeues the selected tasks from data mining task queue table 108, and initiates execution of the dequeued tasks.

Data mining system 104 provides asynchronous execution of data mining tasks, such as tasks 112-126. When the user executes a task, the task validates itself and then it will be enqueued for execution. Data mining system 104 preferably uses a First In First Out (FIFO) approach to execute the enqueued tasks. However, it could also be implemented in a priority fashion where data mining tasks are dequeued and executed according to priority in the queue table. Data mining system 104 has configuration parameters to specify a maximum number of tasks that can be executed simultaneously.

Data Mining System Concepts

Task API Class Concepts

MiningTask

A MiningTask is a unit of work performed asynchronously by a DMS. Typically, it is defined as an abstract class. It is the common super class for all data mining task classes. A mining task will be executed asynchronously in the data mining system (DMS).

MiningDataTask

MiningDataTask is an abstract mining task, which involves data mining operations only, such as building data mining models using build task 112, scoring or applying data mining models to data using apply task 114, testing models using test task 116, lift computation using lift computation task 118, etc. MiningDataTask excludes data pre-processing tasks like data preparation, data transformations, import and export.

ModelImportTask

ModelImportTask 124 is a mining task for importing a model in an external format to a DMS specific internal format. A model must be in the DMS internal format to perform any other operations using that model.

ModelExportTask

ModelExportTask 126 a mining task for exporting a model to an external format from the DMS internal format.

MiningBuildTask

MiningBuildTask 112 is a mining data task for building all mining models supported by the DMS. Build operation chooses the model to be built based on the user specified mining function settings, which must be persisted in the data mining system (DMS). An MFS can be persisted in the DMS using store method. For example, the DMS may supports the building of following mining models:

Association Rules model

Supervised model using Naïve Bayes algorithm

Supervised model using Adaptive Bayes Network algorithm

Clustering model

Attribute Importance Model

ClassificationTestTask

ClassificationTestTask 116 a mining data task for testing a built mining model on a dataset to find the accuracy of the model and compute a confusion matrix. Test task can be performed using any supervised model supported by the DMS.

CrossValidateTask

CrossValidateTask 122 is a special type of mining test task. Cross-validation is one technique for measuring the accuracy of a predictive model. Leave-one-out cross-validation is an especially accurate special case of cross validation, but it is ordinarily computationally expensive. In the case of Naive Bayes models, however, there is a very efficient technique for leave-one-out cross-validation, which is preferably used by the DMS.

MiningLiftTask

MiningLiftTask 118 is a mining data task used for computation of the lift, based on the specified positive target value and the number of quantiles, using the specified supervised mining model in the DMS and the task input data. Lift task can be performed using any supervised model supported by the data mining system.

MiningApplyTask

MiningApplyTask 114 is a mining data task for applying a built mining model on a data to find predictions (score) and associated probabilities. Apply task can be performed using any supervised model supported by the data mining system.

Mining Task Execution Preprocessing and Validations

Each mining task will have preprocessing tasks, data preparation tasks, and/or validation tasks to be performed before the core data mining task. Examples of Such Tasks Include:

MiningTask

A mining task must be persisted into the DMS before executing it. Task name must be unique in the DMS task name space. A mining task can be executed only once.

MiningBuildTask

A mining build task 112 should do the following pre-validations before building the model
1. The associated mining function settings (MFS) object is persisted in the DMS
2. Mining build task must be persisted before execution
3. Model name must be unique in the DMS model name space and must not exceed 64 characters
4. task input data must be compatible with the MFS
5. Algorithm Specific Validations Before submitting the build task to the DMS execution queue, clients must ensure validations 1, 2, 3. Validations 4, 5 will be done at the data mining system ClassificationTestTask A classification test task 116 must do the following pre-validations before testing the model:
1. The test result name must be unique in the DMS test result name space and must not exceed 64 characters
2. The associated model must be a supervised mining model
3. The associated supervised model must be built and persisted in the DMS before the execution of the test
4. Task input data must be compatible with the associated models MFS and the MFS must be a SupervisedFunctionSettings
5. Algorithm Specific Validations Before submitting the test task to the DMS execution queue, clients must ensure validations 1. Validations 2, 3, 4, 5 will be done at the data mining system.

MiningApplyTask

A mining apply task 114 must do the following pre-validations before applying the model
1. The apply result name must be unique in the DMS apply result name space and must not exceed 64 characters
2. The associated model must be a supervised mining model
3. The associated supervised model must be built and persisted in the DMS before the execution of the apply
4. Task input data must be compatible with the associated models MFS and the MFS must be a SupervisedFunctionSettings
5. Algorithm Specific Validations Before submitting the test task to the DMS execution queue, clients must ensure validations 1. Validations 2, 3, 4, 5 will be done at the data mining system.

MiningLiftTask

A mining lift computation task 118 must do the following pre-validations before lift computation:
1. The lift result name must be unique in the DMS lift result name space and must not exceed 64 characters
2. Number of quantiles must be a positive number and must be in the specified boundaries i.e. 2 to 100
3. The associated model must be a supervised mining model
4. The associated supervised model must be built and persisted in the DMS before the execution of the lift computation
5. Task input data must be compatible with the associated models MFS and the MFS must be a SupervisedFunctionSettings
6. Validity of the positive target value with the models target attribute
7. Algorithm Specific Validations Before submitting the lift task to the DMS execution queue, client must ensure validations 1, 2. Validations 3, 4, 5, 6, 7 will be done at the data mining system.

ModelImportTask

A model import task 124 must do the following pre-validations before importing the model:
1. The model name must be unique in the model name space and must not exceed 64 characters
2. Must be a data mining system importable model
3. Validity of the model according to the format.

Before submitting the import task to the DMS execution queue, client must ensure validations 1. Validations 2, 3 will be done at the data mining system.

ModelExportTask

A model export task 126 must do the following pre-validations before exporting the model:
1. Associated export data location must be present in the database and the necessary privileges must be granted.
2. Validity of the model according to the format.

Before submitting the export task to the DMS execution queue, client must ensure validations 1. Validations 2, 3 will be done at the data mining system.

CrossValidateTask

A cross validate task 122 must do the following pre-validations before cross-validating the model:
1. The test result name must be unique in the DMS test result name space and must not exceed 64 characters
2. The associated MFS must be there in the DMS before cross validation
3. Task input data must be compatible with the associated MFS and the MFS must be a SupervisedFunctionSettings
4. Algorithm Specific Validations Before submitting the cross validate task to the DMS execution queue, client must ensure validations 1. Validations 2, 3, 4 will be done at the data mining system.

ModelSeekerTask

A model seeker (MS) task 120 must do the following pre-validations before starting the model seek operation:
1. The associated MFS must be there in the DMS before model seek operation
2. Model seeker summary result name must be unique in the DMS MSResult name space and must not exceed 64 characters
3. Model seeker prefix must be unique in the DMS MSPrefix name space and must not exceed 15 characters
4. Number of quantiles for lift must be a positive number
5. Positive target value must be a valid must be a valid with the target attribute used in the model build
6. Weight value that must be positive and no greater than 1.0.
7. Task input data for both build & test must be compatible with the associated MFS
8. Algorithm Specific Validations Before submitting the cross-validate task to the DMS execution queue, client must ensure validations 1 to 6. Validations 7, 8 will be done at the data mining system.

State Transition Behavior of the Mining Task Object

Figure 2:
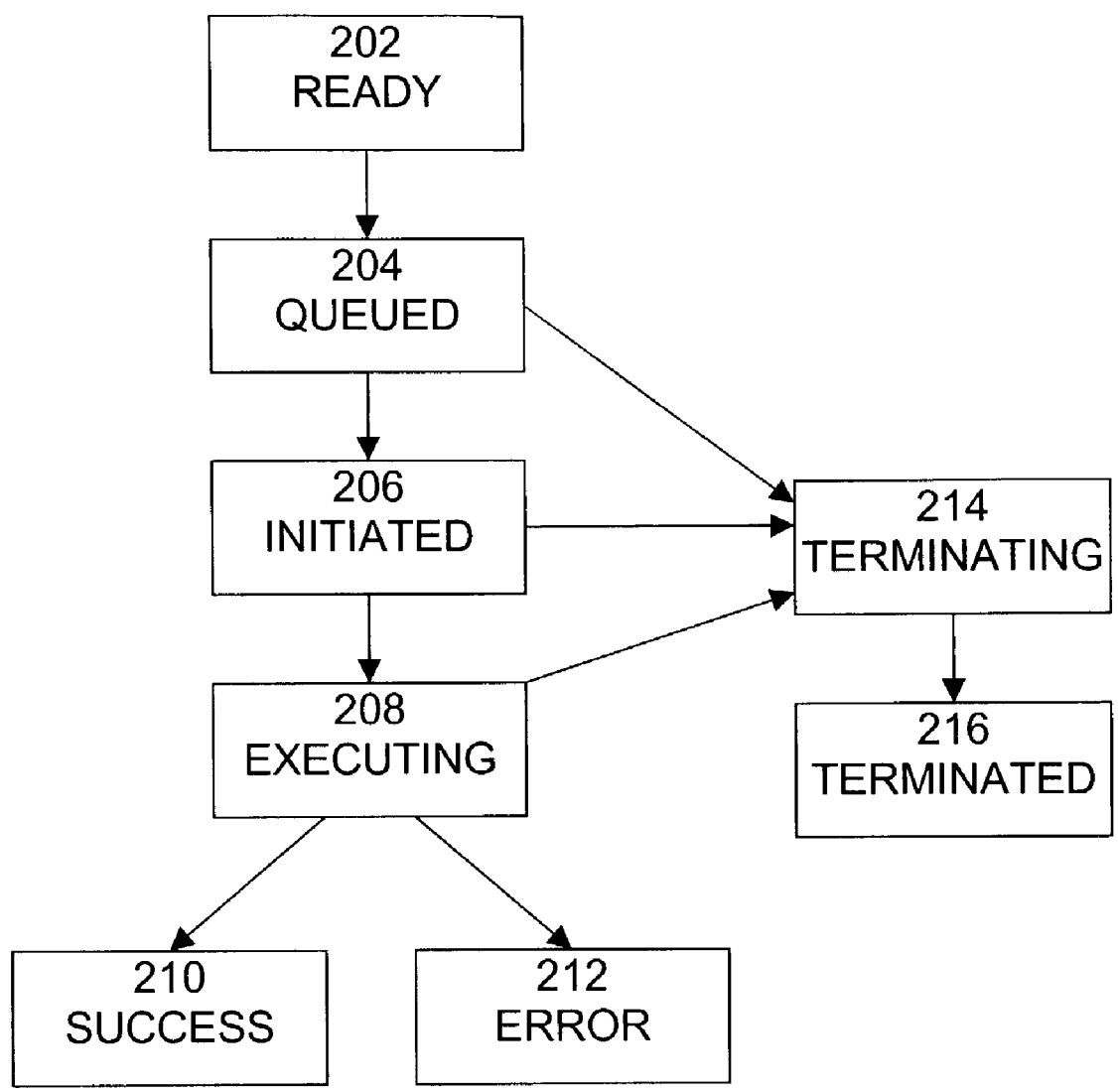
FIG. 2 is an exemplary state diagram of a mining task, such as is shown in FIG. 1.

A mining task, such as any of tasks 112-122, has a number of different states, as shown in FIG. 2. These states are maintained by data mining system 104:

Ready state 202, which indicates that the task is ready to execute. A task will enter this state only after the task is stored in data mining system 104.

Queued state 204, in which state the task is in mining task queue table 108 of data mining system 104 and waiting to be executed.

Initiated state 206, in which state the task is actually submitted for execution in data mining system 104.

Executing state 208, in which state the task is in execution process in data mining system 104.

Success state 210, which indicates that the task execution succeeded.

Error state 212, which indicates that the task execution failed. In this state the MiningTaskStatus object includes error string.

Terminating state 214, in which state the task is in the process of terminating.

Terminated state 216, which indicates that the task is terminated.

Persistence Behavior

The data mining system will support persistence of the mining tasks. A mining task must be persisted with a unique name before executing it. After successful completion of the task, the mining task objects can be used as an information log to know the tasks performed. A mining task is immutable, because it reduces the complexity of maintenance of task execution inside the DMS. Status information also will be persisted in the data mining system for each task. If the task is removed, then the corresponding status information also will be removed.

Task vs. Results

Most of the mining tasks will have corresponding mining results object. Task objects will specify the inputs to perform a task and reference by name to task results. Results object will provide the details of the task results.

Performance

All the mining tasks will be executed as long running database processes (DBMS JOBS). If each task defines the execution resource requirements, then DMS performance can be improved by making resource sensible parallel execution of the asynchronous tasks.

Performance Attributes

Task waiting time

Task execution time

Performance Measurement

As this project involves managing queued tasks, performance of this project can be measured by how efficiently tasks are dequeued to execute in the DMS and concurrent execution of mining tasks. The number of concurrent execution must be carefully set by the DBA.

Scalability

The number of concurrent clients a DMS can support. As this project introduces the asynchronous capability to DMS, an administrator can control the number of tasks to be executed based on the capacity of the data mining system. When a client executes a task, it will enqueue the task in the task-queue of the DMS and returns. It is up to the data mining system when the task actually gets executed.

Functionality

One of the main motivations for this project is to make the data mining system API more usable, scalable and available architecture. Using JMS to make the long running mining operations asynchronous will lead to loose coupling of the data mining system client applications with the data mining system server. This feature will give the ability for effective integration of the data mining system API with many client applications sharing the same data mining system.

JMS-AQ concepts

Advanced Queuing (AQ)

Advanced Queuing ("AQ") is the message queuing functionality provided by the database management system. With this functionality, message queuing operations can be performed in a fashion similar to that of structured query language (SQL) operations from the database management system. The system supports graphical user interfaces (GUIs) for the queue management. AQ has the following features:
- Queues as part of the schema manager to view properties
- Create, start, stop, and drop queues
- Schedule and unscheduled propagation
- Add and remove subscribers
- View propagation schedules for all queues in the database
- View errors for all queues in the database
- View the message queue
- Grant and revoke privileges Java Messaging Service (JMS)

JAVA Message Service (JMS) is the industry Java standard for enterprise messaging, developed jointly by enterprise messaging vendors. Enterprise messaging provides a reliable, scalable, flexible service for asynchronous exchange of critical business data and events among loosely coupled components. Enterprise messaging is now recognized as an essential tool for building enterprise applications.

The JMS API provides a framework that enables the development of portable, message based applications in the JAVA™ programming language. It improves programmer productivity by defining a common set of messaging concepts and programming strategies that will be supported by all leading enterprise messaging vendors.

Data Mining System Client and Server Interaction

Figure 3:
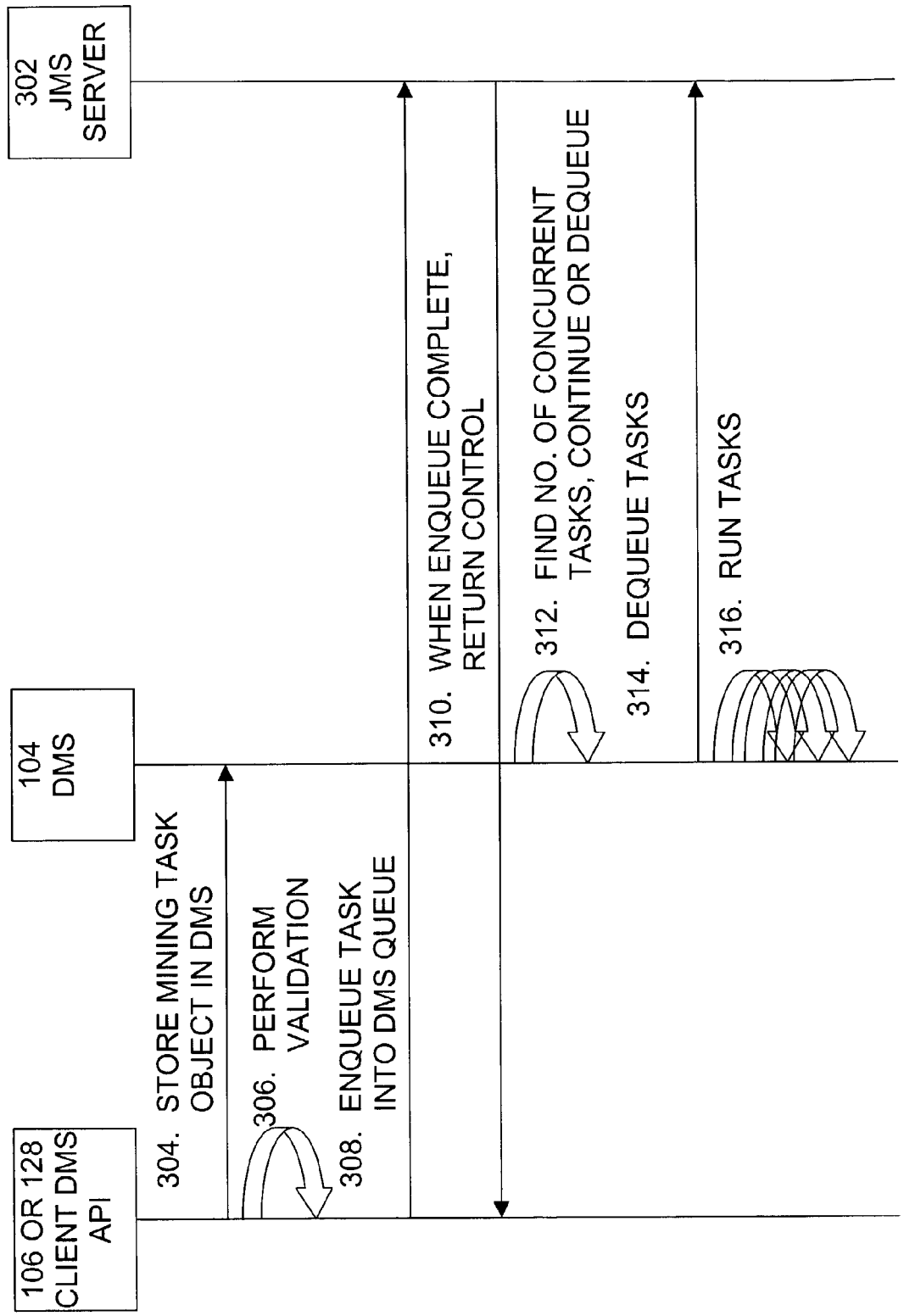
FIG. 3 is an exemplary data flow diagram of the interaction between a client data mining system API, a data mining system 104, and a JAVA™ Messaging Service (JMS) server.

An example of a client-server interaction model of data mining operations in data mining system 104 is illustrated in FIG. 3. As mining operations are long running processes, each process can run for days. FIG. 3 illustrates the interaction between client data mining system API, such as internal API 106 or external API 128, data mining system 104, and a JAVA™ Messaging Service (JMS) server 302.

The interaction begins with step 304, in which the client application uses client data mining system API 106 or 128 to generate and store a data mining task object in data mining system 104. In step 306, a client-level validation of the mining task is performed. In step 308, the data mining task is enqueued into the data mining system defined task queue, such as mining table task queue 108, shown in FIG. 1. In order to enqueue the data mining task, control is passed to the JMS server 302. In step 310, control is returned to the client application upon successful completion of the enqueuing of the data mining task by JMS server 302.

In step 312, the task monitor, such as mining system task monitor 110, shown in FIG. 1, monitors the data mining tasks that are being performed, in order to control the initiation of execution of new data mining tasks. The task monitor determines the number of concurrent tasks running in the data mining system. If the number of concurrent tasks running in the data mining system is less than the maximum number of concurrent data mining tasks that the data mining system can handle, the task monitor will go to step 314, in order to initiate execution of one or more new data mining tasks. If the number of concurrent tasks running in the data mining system is greater than or equal to the maximum number of concurrent data mining tasks that the data mining system can handle, the task monitor will continue to periodically monitor the data mining tasks that are being performed, and based on available resources determine when new tasks should be initiated.

In step 314, the task monitor determines the number of data mining tasks that can be dequeued from mining table task queue 108. The task monitor dequeues each task and initiates execution of each task by submitting it as a job to the data mining system. In step 316, the data mining tasks that have been submitted as jobs to the data mining system are performed. Depending upon the load in the database instance and the database process configuration, the data mining tasks that have been submitted may all be performed concurrently, or the data mining tasks may be performed in one or more groups of one or more data mining tasks.

The data mining system client and server interaction shown in FIG. 3 provides a number of advantages over conventional systems. For example, there is no need for client applications to wait for the data mining system process completion. As shown in FIG. 3, the client application gets control after enqueuing the task into the data mining task queue. The data mining system can manage the enqueued tasks according the configuration of the data mining system by a database administrator. The database administrator can configure the data mining system based on resource availability. In this way, client applications need not manage the load on the data mining system. Availability of the data mining system is increased due to the architectural feature of relatively loose coupling between the client application and the data mining system.

Usage Model

This section describes how the data mining system Mining task API can be used to perform a Naïve Bayes model build, test, and lift and apply. The process definition is as follows:

Use Case Example

Figure 4:
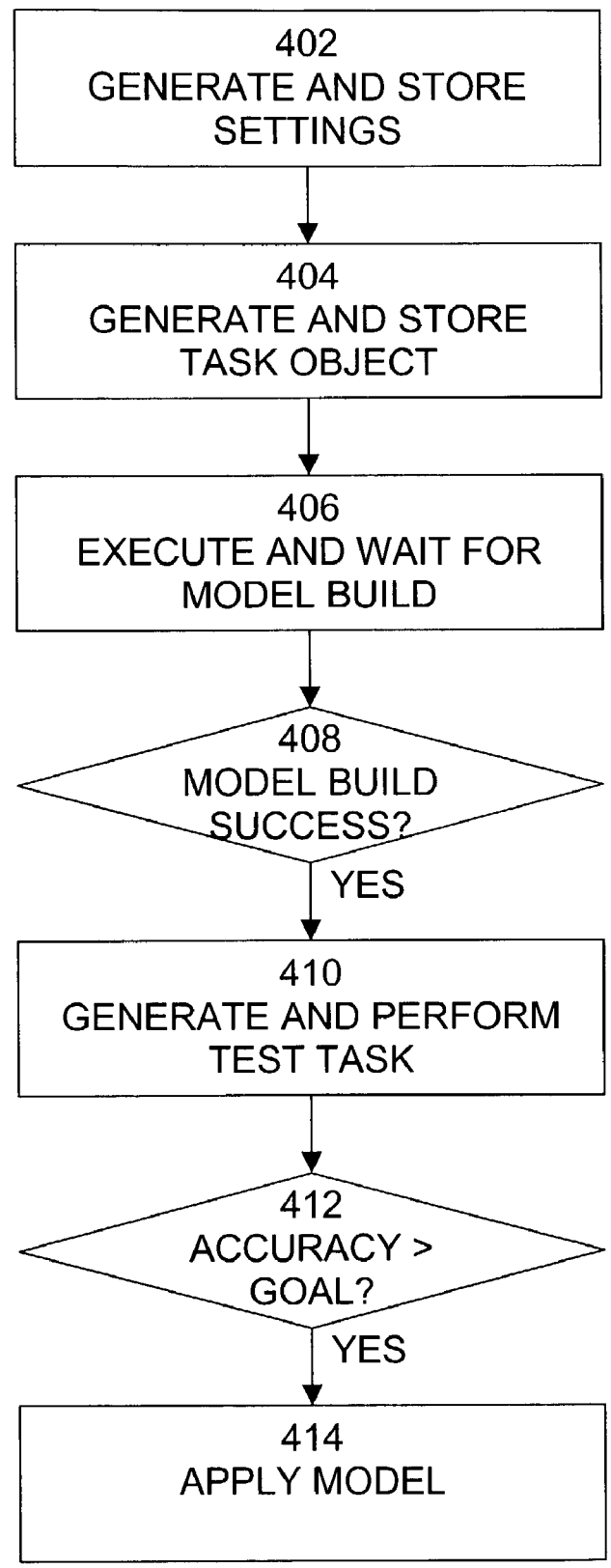
FIG. 4 is an exemplary flow diagram of a process for using the mining task data mining functionality to build, test and apply a data mining model.

An example of a process 400 for using the mining task data mining functionality to build, test and apply a data mining model is shown in FIG. 4. In the example shown in FIG. 4, a Naïve Bayes model is built. Process 400 begins with step 402, in which initial settings or parameters that are used by the model building routines are generated and stored as an object in the data mining system. In step 404, a data mining task build object is generated and stored in the data mining system. This involves specifying the input data to be used to build the model and the name or location of the object including the initial settings or parameters that are used by the model building routines. In step 406, the model build task is executed and completion is awaited. In step 408, it is determined whether the model build task successfully completed. If the model build task successfully completed, then the process continues with step 410, in which an associated test task is generated and stored. The test task tests the model by computing a measure of the accuracy of the model. The test task is performed and outputs the measure of the accuracy of the model. In step 412, the output measure of the accuracy of the model is compared to a goal for the model accuracy. For example, if the output measure of the accuracy of the model is greater than the goal for the model accuracy, the model is considered to be adequately accurate. If the model meets the accuracy goal, then the process continues with step 414, in which a model apply task is generated, stored, and performed. The apply task scores an input dataset using the model and outputs a score dataset.

Figure 5:
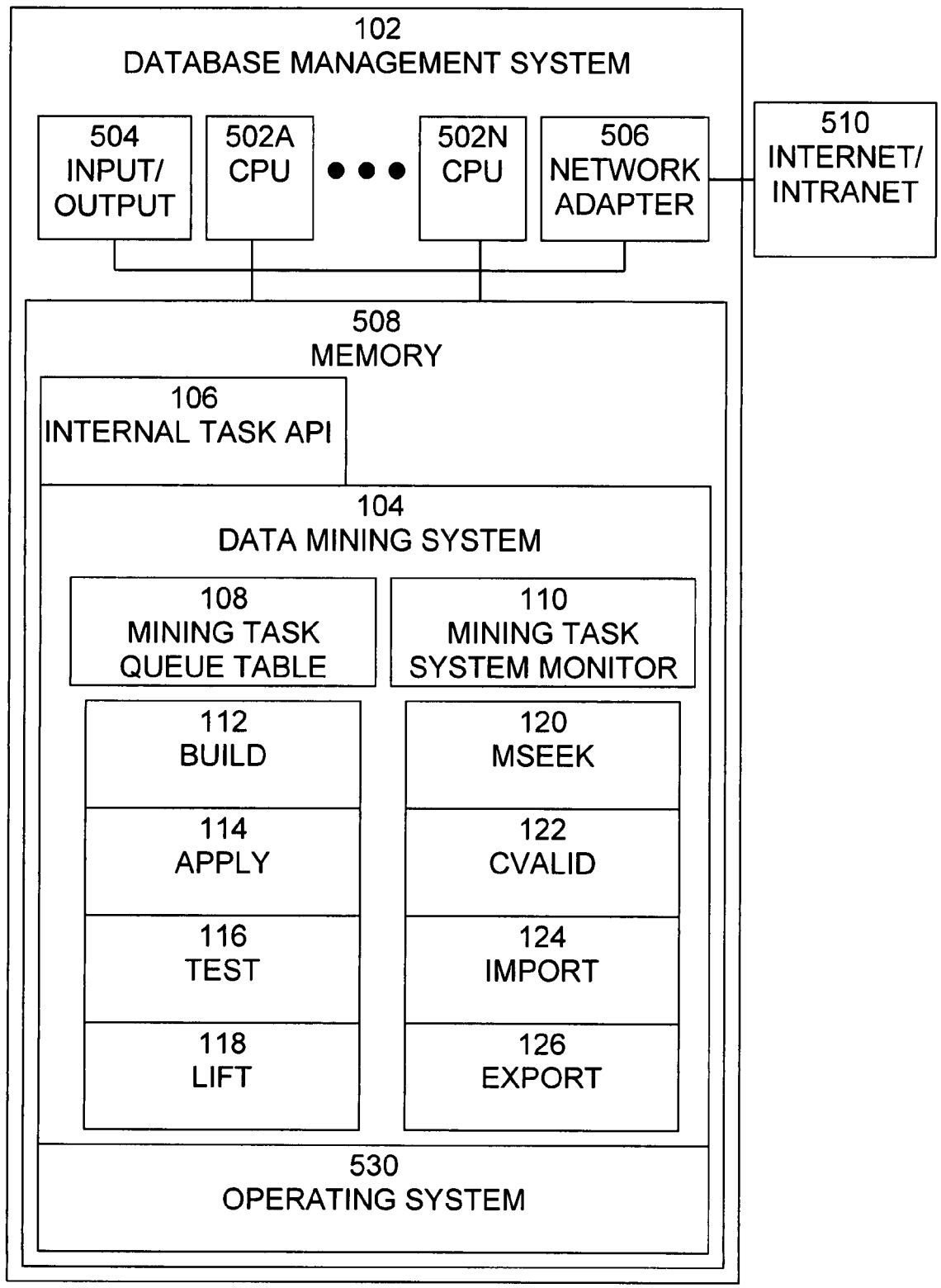
FIG. 5 is an exemplary block diagram of a database management system, in which the present invention may be implemented.

An exemplary block diagram of a database management system 102, in which the present invention may be implemented, is shown in FIG. 5. Database management system 102 is typically a programmed general-purpose computer system, such as a personal computer, workstation, server system, and minicomputer or mainframe computer. Database management system 102 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which database management system 102 is implemented as a single multi-processor computer system, in which multiple processors 502A-502N share system resources, such as memory 508, input/output circuitry 504, and network adapter 506. However, the present invention also contemplates embodiments in which database management system 102 is implemented as a plurality of networked computer systems, which may be single-processor computer systems, multi-processor computer systems, or a mix thereof.

Input/output circuitry 504 provides the capability to input data to, or output data from, data mining system 102. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces database management system 102 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of database management system 102. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 5, memory 508 includes data mining system (DMS) 104 and internal task application program interface (API) 106. Data mining system 104 includes mining task queue table 108, mining system task monitor 110, and a plurality of mining tasks, such as build task 112, apply task 114, test task 116, lift computation task 118, model seeker task 120, cross-validation task 122, model import task 124, and model export task 126. Internal task API 106 provides an interface to data mining system 104 for internal database application in database system 102. External task API 128, shown in FIG. 1, provides similar functionality for external applications, which are external to database management system 102 and which communicate with data mining system 104 through database management system 102.

Data mining system 104 performs data mining tasks in accordance with the present invention. Data mining system 104 includes mining task queue table 108, which maintains the queues necessary for performing the data mining tasks. Internal task API 106 and external task API 128 provide an interface for applications to enqueue tasks into mining task data table 108, dequeue tasks from mining task data table 108, and manage tasks in mining task data table 108. Data mining system monitor 110 performs browsing of mining task data table 108, dequeue of the tasks from mining task data table 108, monitoring of the currently executing the tasks in Data mining system 104, and executing the dequeued tasks.

Data mining system 104 provides asynchronous execution of data mining tasks, such as tasks 112-126. When the user executes a task, the task validates itself and then it will be enqueued for execution. Data mining system 104 preferably uses a First In First Out (FIFO) approach to execute the enqueued tasks, but could also be envisioned to use a priority based dequeueing scheme. Data mining system 104 has configuration parameters to specify a maximum number of tasks that can be executed simultaneously.

Operating system 530 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented data mining system configured to identify patterns and relationships among a collection of stored data for a computerized database management system comprising a processor operable to execute computer program instructions and a memory operable to store computer program instructions executable by the processor, comprising:

a plurality of data mining task objects operable to perform data mining functions upon data mining models, wherein each data mining model accepts as input at least a portion of the collection of stored data representing tangible activities including at least one of: data collected by companies and other organizations, accounting activities, billing activities, profiling of customer activities and relations, manufacturing operations, web-site activity, and marketing activities, and identifies and outputs patterns and relationships among the collection of stored data, the output patterns and relationships representing actual patterns and relationships among the tangible activities represented by the collection of stored data, wherein the plurality of data mining task objects are selected from a group of data mining task objects comprising:

a data mining build task object operable to perform a data mining function for building a data mining model for identifying the patterns and relationships among the collection of stored data, a data mining apply task object operable to perform a data mining function for applying a built data mining model to the collection of stored data to score the collection of stored data, and compute associated probabilities for the collection of stored data; a data mining test task object operable to perform a data mining function for testing a built mining model with a dataset to find an accuracy of the data mining model and compute a confusion matrix; a data mining lift task object operable to perform a data mining function for computing a lift of a data mining model, based on a positive target value and a number of quantiles, a data mining cross-validation task object operable to perform a data mining function for performing a cross-validation on a data mining model to determine an accuracy of the data mining model, a data mining import task object operable to perform a data mining function for importing a data mining model in an external format to an internal format of the data mining system, and a data mining export task object operable to perform a data mining function for exporting a data mining model in an internal format of the data mining system to an external format;

a data mining task queue table operable to maintain at least one queue to manage execution of the data mining task objects; and a data mining system task monitor operable to monitor execution of currently executing data mining task objects, examine the data mining task queue table, select at least one data mining task object for execution, dequeue data mining task objects from the data mining task queue table, and initiate execution of the dequeued task objects.

2. The computer-implemented data mining system of claim 1, wherein a data mining task object to be enqueued in the data mining task queue table is received from a client application.

3. The computer-implemented data mining system of claim 2, wherein control is returned to the client application when enqueuing of the data mining task object is complete.

4. The computer-implemented data mining system of claim 3, wherein data mining system task monitor is further operable to perform a data mining functions for determining a number of concurrent data mining task objects executing in the data mining system, initiating execution of at least one data mining task objects, if the number of concurrent data mining task objects running in the data mining system is less than a maximum number of concurrent data mining data mining task objects that the data mining system can handle, and continue to monitor the data mining task objects that are being executed.

5. The computer-implemented data mining system of claim 4, wherein each of the data mining task objects has a state indicating a behavior of the data mining task object.

6. The computer-implemented data mining system of claim 5, wherein the state of a data mining task object comprises:

a ready state indicating that the data mining task object is ready to execute;

a queued state indicating that the data mining task object is in the data mining task queue table and waiting to be executed;

an initiated state indicating that the data mining task object is actually submitted for execution;

an executing state indicating that the data mining task object is in execution;

a success state indicating that a data mining task object execution succeeded;

an error state indicating that the data mining task object execution failed;

a terminating state indicating that the data mining task object is in a process of terminating; and a terminated state indicating that the data mining task object is terminated.

7. A computer-implemented method of performing data mining to identify patterns and relationships among a col lection of stored data in a computerized database management system, comprising the steps of:

receiving a data mining task object operable to perform a data mining function upon data mining models, wherein each data mining model accepts as input at least a portion of the collection of stored data representing tangible activities including at least one of: data collected by companies and other organizations, accounting activities, billing activities, profiling of customer activities and relations, manufacturing operations, web-site activity, and marketing activities, and identifies and outputs patterns and relationships among the collection of stored data, the output patterns and relationships representing actual patterns and relationships among the tangible activities represented by the collection of stored data, the data mining task object to be enqueued in a data mining task queue table, wherein the data mining task object is selected from a group of data mining task objects comprising:

a data mining build task object operable to perform a data mining function for building a data mining model for identifying the patterns and relationships among the collection of stored data, a data mining apply task object operable to perform a data mining function for applying a built data mining model to the collection of stored data to score the collection of stored data, and compute associated probabilities for the collection of stored data; a data mining test task object operable to perform a data mining function for testing a built mining model with a dataset to find an accuracy of the data mining model and compute a confusion matrix; a data mining lift task object operable to perform a data mining function for computing a lift of a data mining model, based on a positive target value and a number of quantiles, a data mining cross-validation task object operable to perform a data mining function for performing a cross-validation on a data mining model to determine an accuracy of the data mining model, a data mining import task object operable to perform a data mining function for importing a data mining model in an external format to an internal format of the data mining system, and a data mining export task object operable to perform a data mining function for exporting a data mining model in an internal format of the data mining system to an external format;

enqueuing the received data mining task object in the data mining task queue table;

monitoring execution of currently executing data mining task objects examining the data mining task queue table;

selecting at least one data mining task object for execution;

dequeuing the selected data mining task object from the data mining task queue table; and initiating execution of the dequeued data mining task object.

8. The computer-implemented method of claim 7, wherein the data mining task object to be enqueued is received from a client application.

9. The computer-implemented method of claim 8, further comprising the step of:

returning control to the client application when enqueuing of the data mining task object is complete.

10. The computer-implemented method of claim 9, wherein the step of monitoring execution of currently executing data mining tasks comprises the steps of:

determining a number of concurrent data mining task objects executing in the data mining system;

initiating execution of at least one data mining task objects, if the number of concurrent data mining task objects running in the data mining system is less than a maximum number of concurrent data mining task objects that the data mining system can handle; and continuing to monitor the data mining task objects that are being executed, if the number of concurrent data mining task objects running in the data mining system is greater than or equal to the maximum number of concurrent data mining task objects that the data mining system can handle.

11. The computer-implemented method of claim 10, wherein each of the data mining task objects has a state indicating a behavior of the data mining task object.

12. The computer-implemented method of claim 11, wherein the state of a data mining task object comprises:

a ready state indicating that the data mining task object is ready to execute;

a queued state indicating that the data mining task object is in the data mining task queue table and waiting to be executed;

an initiated state indicating that the data mining task object is actually submitted for execution;

an executing state indicating that the data mining task object is in execution;

a success state indicating that a data mining task object execution succeeded;

an error state indicating that the data mining task object execution failed;

a terminating state indicating that the data mining task object is in a process of terminating; and a terminated state indicating that the data mining task object is terminated.

13. A system for performing data mining to identify patterns and relationships among a collection of stored data in a database management system, comprising:

a processor operable to execute computer program instructions; and a memory operable to store computer program instructions executable by the processor, for performing the steps of:

receiving a data mining task object operable to perform a data mining function upon data mining models, wherein each data mining model accepts as input at least a portion of the collection of stored data representing tangible activities including at least one of: data collected by companies and other organizations, accounting activities, billing activities, profiling of customer activities and relations, manufacturing operations, web-site activity, and marketing activities, and identifies and outputs for identifying the patterns and relationships among the collection of stored data, the output relationships representing actual patterns and relationships among the tangible activities represented by the collection of stored data, the data mining task object to be enqueued in a data mining task queue table, wherein the data mining task object is selected from a group of data mining task objects comprising:

a data mining build task object operable to perform a data mining function for building a data mining model for identifying the patterns and relationships among the collection of stored data, a data mining apply task object operable to perform a data mining function for applying a built data mining model to the collection of stored data to score the collection of stored data, and compute associated probabilities for the collection of stored data; a data mining test task object operable to perform a data mining function for testing a built mining model with a dataset to find an accuracy of the data mining model and compute a confusion matrix; a data mining lift task object operable to perform a data mining function for computing a lift of a data mining model, based on a positive target value and a number of quantiles, a data mining cross-validation task object operable to perform a data mining function for performing a cross-validation on a data mining model to determine an accuracy of the data mining model, a data mining import task object operable to perform a data mining function for importing a data mining model in an external format to an internal format of the data mining system, and a data mining export task object operable to perform a data mining function for exporting a data mining model in an internal format of the data mining system to an external format;

enqueuing the received data mining task object in the data mining task queue table;

monitoring execution of currently executing data mining task objects examining the data mining task queue table;

selecting at least one data mining task object for execution;

dequeuing the selected data mining task object from the data mining task queue table; and initiating execution of the dequeued data mining task object.

14. The system of claim 13, wherein the data mining task object to be enqueued is received from a client application.

15. The system of claim 14, further comprising the step of:

returning control to the client application when enqueuing of the data mining task object is complete.

16. The system of claim 15, wherein the step of monitoring execution of currently executing data mining tasks comprises the steps of:

determining a number of concurrent data mining task objects executing in the data mining system;

initiating execution of at least one data mining task objects, if the number of concurrent data mining task objects running in the data mining system is less than a maximum number of concurrent data mining task objects that the data mining system can handle; and continuing to monitor the data mining task objects that are being executed.

17. The system of claim 16, wherein each of the data mining task objects has a state indicating a behavior of the data mining task object.

18. The system of claim 17, wherein the state of a data mining task object comprises:

a ready state indicating that the data mining task object is ready to execute;

a queued state indicating that the data mining task object is in the data mining task queue table and waiting to be executed;

an initiated state indicating that the data mining task object is actually submitted for execution;

an executing state indicating that the data mining task object is in execution;

a success state indicating that a data mining task object execution succeeded;

an error state indicating that the data mining task object execution failed;

a terminating state indicating that the data mining task object is in a process of terminating; and a terminated state indicating that the data mining task object is terminated.

19. A computer program product for performing data mining to identify patterns and relationships among a collection of stored data in a database management system, comprising:

a computer readable storage medium;

computer program instructions, recorded on the computer readable storage medium, executable by a processor, for performing the steps of:

receiving a data mining task object operable to perform a data mining function upon data mining models, wherein each data mining model accepts as input at least a portion of the collection of stored data representing tangible activities including at least one of: data collected by companies and other organizations, accounting activities, billing activities, profiling of customer activities and relations, manufacturing operations, web-site activity, and marketing activities, and identifies and outputs patterns and relationships among the collection of stored data, the output patterns and relationships representing actual patterns and relationships among the tangible activities represented by the collection of stored data, the data mining task object to be enqueued in a data mining task queue table, wherein the data mining task object is selected from a group of data mining task objects comprising:

a data mining build task object operable to perform a data mining function for building a data mining model for identifying the patterns and relationships among the collection of stored data, a data mining apply task object operable to perform a data mining function for applying a built data mining model to the collection of stored data to score the collection of stored data, and compute associated probabilities for the collection of stored data; a data mining test task object operable to perform a data mining function for testing a built mining model with a dataset to find an accuracy of the data mining model and compute a confusion matrix; a data mining lift task object operable to perform a data mining function for computing a lift of a data mining model, based on a positive target value and a number of quantiles, a data mining cross-validation task object operable to perform a data mining function for performing a cross-validation on a data mining model to determine an accuracy of the data mining model, a data mining import task object operable to perform a data mining function for importing a data mining model in an external format to an internal format of the data mining system, and a data mining export task object operable to perform a data mining function for exporting a data mining model in an internal format of the data mining system to an external format;

enqueuing the received data mining task object in the data mining task queue table;

monitoring execution of currently executing data mining task objects;

examining the data mining task queue table;

selecting at least one data mining task object for execution;

dequeuing the selected data mining task object from the data mining task queue table; and initiating execution of the dequeued data mining task object.

20. The computer program product of claim 19, wherein the data mining task object to be enqueued is received from a client application.

21. The computer program product of claim 20, further comprising the step of:

returning control to the client application when enqueuing of the data mining task object is complete.

22. The computer program product of claim 21, wherein the step of monitoring execution of currently executing data mining tasks comprises the steps of:

determining a number of concurrent data mining task objects executing in the data mining system;

initiating execution of at least one data mining task objects, if the number of concurrent data mining task objects running in the data mining system is less than a maximum number of concurrent data mining task objects that the data mining system can handle; and continuing to monitor the data mining task objects that are being executed.

23. The computer program product of claim 22, wherein each of the data mining task objects has a state indicating a behavior of the data mining task object.

24. The computer program product of claim 23, wherein the state of a data mining task comprises:

a ready state indicating that the data mining task object is ready to execute;

a queued state indicating that the data mining task object is in the data mining task queue table and waiting to be executed;

an initiated state indicating that the data mining task object is actually submitted for execution;

an executing state indicating that the data mining task object is in execution;

a success state indicating that a data mining task object execution succeeded;

an error state indicating that the data mining task object execution failed;

a terminating state indicating that the data mining task object is in a process of terminating; and a terminated state indicating that the data mining task object is terminated.

* * * * *